(12) United States Patent
LaRosa et al.

(10) Patent No.: US 6,532,191 B2
(45) Date of Patent: Mar. 11, 2003

(54) SYSTEM AND METHOD FOR TARGET TRACKING AND MOTION ANYALYSIS

(75) Inventors: Victor P. LaRosa, Cicero, NY (US); Charles G. Muniak, Syracuse, NY (US); Walter S. Wojciechowski, Hope Valley, RI (US)

(73) Assignee: Lockhead Martin Corporation, Bethesda, MD (US)

( * ) Notice: Subject to any disclaimer, the term of this patent is extended or adjusted under 35 U.S.C. 154(b) by 0 days.

(21) Appl. No.: 09/924,248

(22) Filed: Aug. 8, 2001

(65) Prior Publication Data

US 2002/0097635 A1 Jul. 25, 2002

Related U.S. Application Data (60) Provisional application No. 60/223,794, filed on Aug. 8, 2000.

(51) Int. Cl.⁷ .............................. G01S 3/80; G01S 13/00
(52) U.S. Cl. ......................... 367/124; 342/90; 342/195
(58) Field of Search .................................. 367/131, 124, 367/135; 342/90, 95, 195, 451; 348/169

(56) References Cited

U.S. PATENT DOCUMENTS

| | | | | |
|---|---|---|---|---|
| 5,144,595 A | * | 9/1992 | Graham et al. | 367/135 |
| 5,537,119 A | * | 7/1996 | Poore, Jr. | 342/90 |
| 5,877,998 A | * | 3/1999 | Aidala et al. | 367/124 |

OTHER PUBLICATIONS

Miller et al., "Optimizing Murty's RankedAssignment Method", Aerospace and Electronic Systems, IEEE Transactions on , vol.: 33 Issue: 3, Jul. 1997, pp.: 851–862.*
Schulz; MLE SRS Notes; MLE.CHI; Rev. 6; Aug. 11, 1989; p. 1–18.
Schulz; MPKAST SRS Notes; MPK2.CHI; Nov. 17, 1989; p. 1–10.
Bar Shalom et al., Tracking and Data Acquisition, Mathematics in Science and Engineering, vol. 179, 1988.*

* cited by examiner

*Primary Examiner*—Ian J. Lobo
(74) *Attorney, Agent, or Firm*—Arthur L. Plevy; Duane Morris, Attorneys at Law (57) ABSTRACT

A method for improving the determination of tracking and motion analysis information obtained from a set of received data points is presented. The method comprises selecting a determined number of data points for processing, determining at least one cost analysis matrix for each information item included in the selected data points, quantifying each of the at least one cost analysis matrix with regard to a known form; and providing a presentation for each of the quantified matrices. An operator may then discard those presented matrices that provide minimal levels of information and retain those that provide significant levels of information.

25 Claims, 13 Drawing Sheets

FIG. 1a

PRIOR ART

FIG. 1b

PRIOR ART

|     | 170 | 171 | 172 | 173 | 174 | 175 | 176 | 177 |
|-----|-----|-----|-----|-----|-----|-----|-----|-----|
| 160 |     | 160/5.5 | 175/6.6 | 188/8.5 | 195/10.5 | 200/12.5 | 204/14.5 | 207/17 |
| 161 | 135/5 | 135/5 | 160/5.5 | 175/6.6 | 188/8.5 | 195/10.5 | 200/12.5 | 204/14.5 |
| 162 | 110/5.5 | 110/5.5 | 135/5 | 160/5.5 | 175/6.6 | 188/8.5 | 195/10.5 | 200/12.5 |
| 163 | 092/6.7 | 092/6.7 | 110/5.5 | 135/5 | 160/5.5 | 175/6.6 | 188/8.5 | 195/10.5 |
| 164 | 081/8.5 | 081/8.5 | 092/6.7 | 110/5.5 | 135/5 | 160/5.5 | 175/6.6 | 188/8.5 |
| 165 | 073/10.5 | 073/10.5 | 081/8.5 | 092/6.7 | 110/5.5 | 135/5 | 160/5.5 | 175/6.6 |
| 166 | 068/12.5 | 068/12.5 | 073/10.5 | 081/8.5 | 092/6.7 | 110/5.5 | 135/5 | 160/5.5 |
| 167 | 062/16.0 | 064/14.5 | 068/12.5 | 073/10.5 | 081/8.5 | 092/6.7 | 110/5.5 | 135/5 |

FIG. 1c

PRIOR ART

FIG. 2a

PRIOR ART

FIG. 2b

PRIOR ART

|     | 170'    | 171'    | 172'    | 173'    | 174'   | 175'    | 176'    | 177'    |
| --- | ------- | ------- | ------- | ------- | ------ | ------- | ------- | ------- |
| 160 | 084/2.5 | 092/3.5 | 086/5.8 | 087/7.6 | 086/10 | 081/8.3 | 080/9.8 | 080/11. |
| 161 | 123/1.6 | 117/2.7 | 095/5.1 | 093/6.2 | 090/4.8 | 094/4.8 | 087/8.6 | 085/9.3 |
| 162 | 169/1.9 | 139/2.7 | 116/4.2 | 110/5.1 | 099/6.8 | 081/7.1 | 095/9.5 | 090/9.1 |
| 163 | 193/3.0 | 162/3.2 | 138/4.0 | 132/4.7 | 113/6.0 | 177/6.5 | 102/6.8 | 094/8.7 |
| 164 | 204/4.5 | 186/4.3 | 157/4.3 | 150/4.8 | 127/5.6 | 107/5.6 | 111/6.8 | 100/3.1 |
| 165 | 209/5.9 | 194/5.4 | 125/5   | 160/5.3 | 142/5.6 | 120/5.6 | 121/5.9 | 107/4.5 |
| 166 | 212/7.5 | 200/6.5 | 187/6.2 | 171/5.9 | 151/6.1 | 135/5   | 127/5.3 | 110/7.0 |
| 167 | 214/9.2 | 205/8.2 | 173/7.4 | 180/7.4 | 173/7.2 | 157/5.4 | 145/5.9 | 124/6.1 |

FIG. 2c

PRIOR ART

FIG. 2d

PRIOR ART

SYSTEM AND METHOD FOR TARGET TRACKING AND MOTION ANYALYSIS

CROSS REFERENCE TO RELATED APPLICATION

This application relates to and claims the benefit of the earlier filing date, pursuant to 35 U.S.C. § 119, of provisional patent application Ser. No. 60/223,794, entitled "Solution Imaging Target Motion Analysis Evaluator (SITE)," having a filing date of Aug. 8, 2000, the entirety of which is hereby incorporated by reference.

GOVERNMENTAL INTEREST

This invention was prepared under government contract N0002496C06216 (P.O.S.S.). The United States Government has a non-exclusive, non-transferable, paid-up license in this invention.

FIELD OF THE INVENTION

This invention relates to target tracking and motion analysis and more specifically, for determining a radiating source's relative track and motion and the quality of the determined relative track from the data received.

BACKGROUND OF THE INVENTION

Determining certain track and motion parameters, such as location, range, direction or course and speed, of a target or radiating source, from information items received from the target or radiating source, is a general problem of considerable importance to many types of surveillance systems. For example, a determined location, direction and speed can be used to track a target and anticipate its future location. This projected information can then be provided to a second system, via a wired or wireless network, which may, for example, determine a provide an intercept at the projected future target location. As would be understood in the art, a radiating source or target can be a vehicle, for example, a ship, truck or plane, that actively generates or emits a visual, acoustical or electro-magnetic energy signal, or a vehicle that passively reflects visual, acoustical or electromagnetic energy. Such received reflected data, referred to as contact data, is processed as if the vehicle or target radiated the reflected energy itself. For example, acoustical systems, e.g., SONAR, and electro-magnetic systems, e.g., RADAR, are well known in the art for processing received energy signals that are reflected from a vehicle or target. Accordingly, a source, vehicle or target may be an active or a passive radiating source, and is often referred to in the art as an emitter or contact.

Manual, automatic and computer-aided manual methods for determining location, range and/or course and speed of emitters or contacts are well known in the art. The methods of Track Motion Analysis (TMA) are well known in the art and have a number of common operating characteristics. For example, each method requires a set of measured data (e.g., bearings). And each functional adjusts a set of parameters (such as: x/y position or x/y velocity in the Cartesian plane, to make the parameter set agree with the measured. The parameter set that agrees best with the measured data is deemed to be the solution estimate. An example of a manual method is the Manual Adaptive Target Motion Analysis Evaluator (MATE). In this method, the operator defines a set of data points, edits the data points to remove bad, unacceptable or incorrect data, and modifies the solution parameter set to minimize the errors between the measured data point values and the theoretical value. An example of an automatic or computer-aided method is a Maximum Likelihood Estimator (MLE) where, the algorithm automatically defines the data set based upon a set of algorithm control parameters, pre-edits the measured data to remove bad, unacceptable or incorrect data points, and automatically adjusts the parameter set in an algorithmic manner to achieve a solution that best agrees with the measured data set. A second automatic or computer-aided method is a Modified Polar Kalman Statistical Tracker (MPKAST), which starts with a guess or an estimate of a solution, then processes received data points, which are then edited to remove bad, unacceptable or incorrect data points and iteratively improves the initial guess or estimate to arrive at a solution that best agrees with the received or measured data point set.

However, manual methods are labor intensive and time consuming. They often fail to arrive at a solution in a time interval that is commensurate with the need for the solution. Automatic methods, which can arrive at a solution quickly, can produce solutions significantly in error because of a few bad data points. Computer-aided methods provide a compromise between fast solutions and accurate solutions. These methods allow an operator to evaluate the solution in view of the received data and the ability to remove bad data points that would induce errors in the solution. While computer-aided solutions appear a practical means for determining a target or emitter location, course and speed from single sensor received data, such systems begin to overwhelm the operator as the amount of data received increases or the system is expanded to received data from multiple sensors, which must be integrated and evaluated. In such multi-sensor systems, the computer-aided solution is hampered by the workload imposed upon the operator in evaluating multiple sensor information.

Hence, there is a need for a system operable to process information from a number of data sources that can provide a target tracking and motion solution (i.e. bearing, range, course and speed) with an associated merit of solution quality in an integrated manner while reducing the workload of the operator for evaluation

SUMMARY OF THE INVENTION

A method for improving the determination of tracking and motion analysis information obtained from a set of received data points is presented. The method comprises selecting a determined number of data points for processing, determining at least one cost matrix for each information item included in the selected data points, quantifying each of the at least one cost analysis matrix with regard to a known form; and providing a presentation for each of the quantified cost matrices. In one embodiment of the invention, the data points can be selected manually, automatically or automatically but retained with manual intervention. In another embodiment of the invention, each of the quantified cost matrices from different information items are presented in a consistent manner.

It is to be understood that these drawings are solely for purposes of illustrating the concepts of the invention and are not intended as a level of the limits of the invention. It will be appreciated that the same reference numerals, possibly supplemented with reference characters where appropriate, have been used throughout to identify corresponding parts.

DETAILED DESCRIPTION OF THE PRESENT INVENTION

Figure 1A:
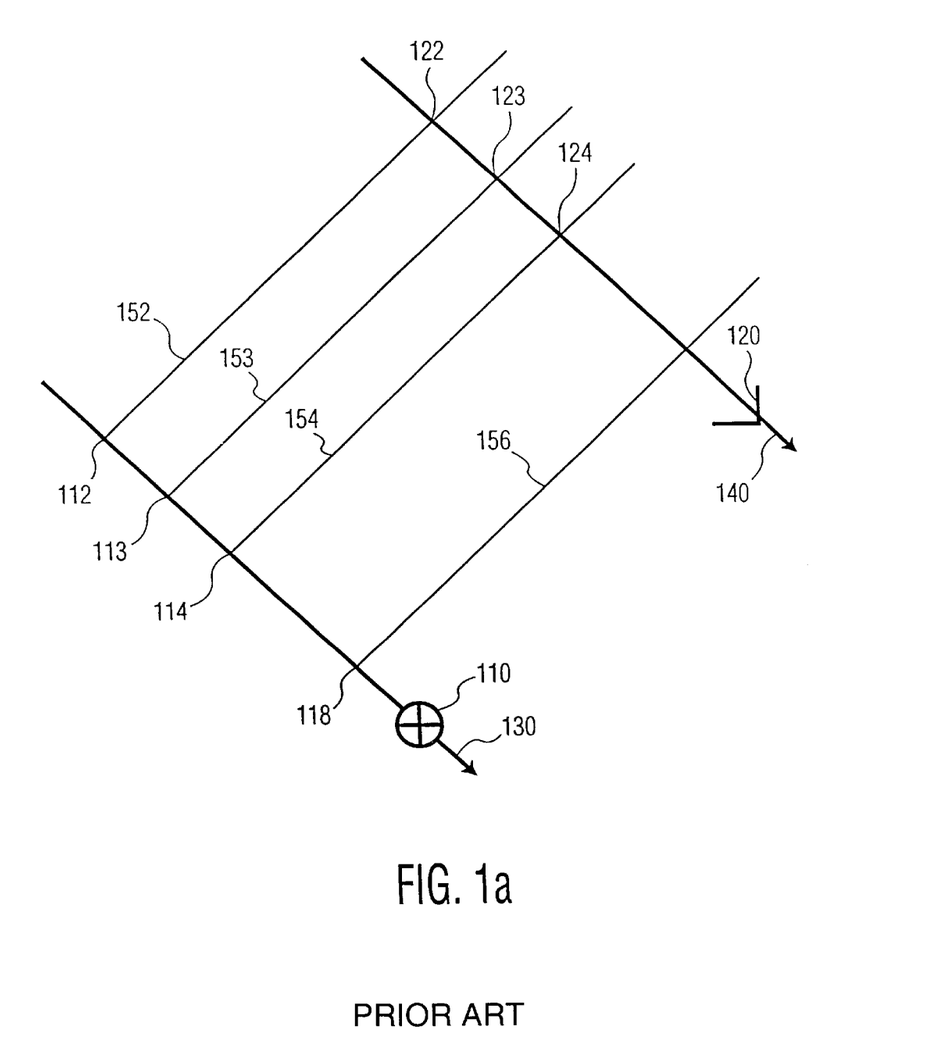
FIGS. 1a–1c illustrate a conventional method for processing data received from a radiating source.

FIG. 1a illustrates a conventional tracking plot of data received by receiving system 110 that was emitted by or reflected from emitter or contact 120. In this illustrative example, receiving system 110 and emitter 120 are traveling on a parallel course and speed, represented as tracks 130 and 140, respectively. At each of the illustrated contact points, represented as 112, 113,114, etc., bearing lines, shown as lines 152, 153,154, etc., corresponding to the direction of arrival of received or intercepted data emitted by, or reflected from, target 120 are also shown. Received or measured data, as shown here, includes bearing information, which is also referred to as direction of arrival, or angle of arrival data. It would be appreciated that measured data can also include measured parameters or characteristics such as time, time difference of arrival, frequency, phase, etc. Sensor Position points 112, 113, 114, etc., correspond to those locations of receiving system 110 that data from target 120 was received or intercepted. Position points 112, 113, 114, etc., may be represented, for example, in an x-y or Cartesian coordinate system, a polar, a spherical coordinate system or in latitude/longitude, with the appropriate correction for longitude convergence.

From FIG. 1, it is shown that at any given time the relative direction of a target is known but the range, course, and speed of the contact is not known. Thus, while it is known that target 120 may be detected along bearing line 152, emanating from contact point 112, neither the relative range nor the location of target 120, represented as point 122, can be determined at the time of the intercept. Similarly, while target 120 may be detected along bearing line 153, emanating from contact point 113 the range or location of target 120, represented as point 123, cannot be determined at the time of the intercept. In this illustrative example, although using multiple bearing lines it is possible to determine the direction of relative motion of target 120, it is not possible to determine the range to target 120 to within a predetermined level of certainty or within desired set of parameters, for example, within 100 meters.

Figure 1B:
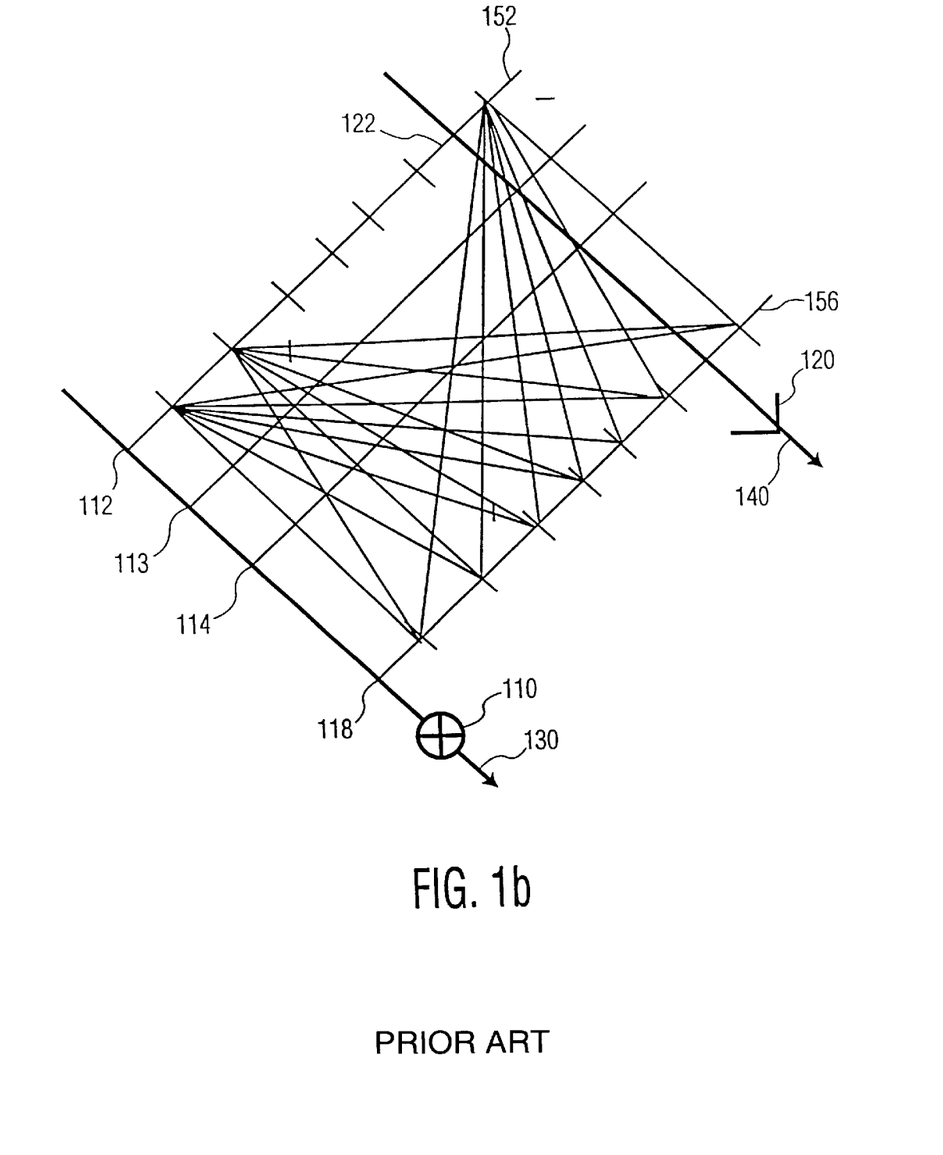

FIG. 1b illustrates a well-known method of determining motion and range information from the bearing data. In this method, a number of locations or ranges are established along a first or initial bearing line in the data reception sequence. In this illustrative example, eight locations or ranges, represented as locations 160, 161, 162, etc., are established along bearing line 152. It would be appreciated that any number of locations or ranges may be established along a first or initial bearing line and that the eight shown here are merely used to illustrate the method.

Figure 1C:
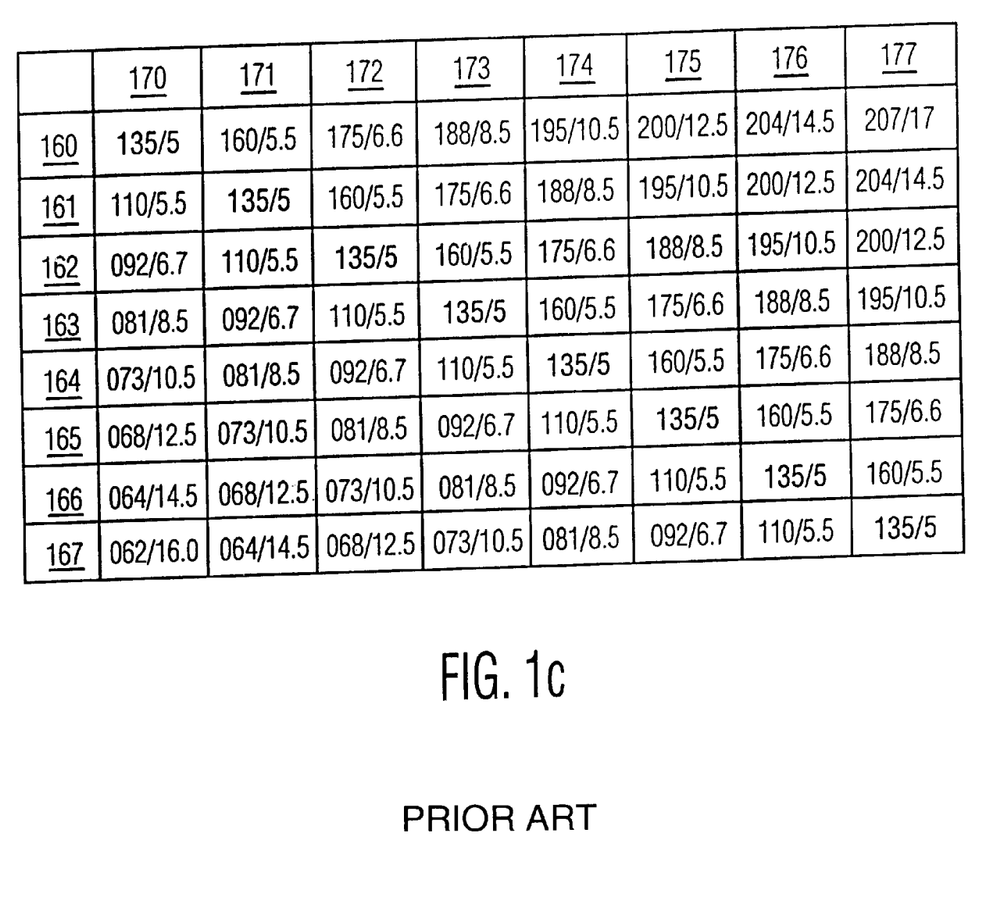

A similar number of corresponding locations or ranges are established along a last bearing line. In this illustrative example, locations 170, 171, 172, etc., are established along bearing line 156 which correspond to the locations or ranges established along first bearing line 152. For each of the locations or ranges located along initial bearing line 152 and final bearing line 156, projection vectors, i.e., direction and speed, are determined which traverse from a location on initial bearing line 152 to a location on final bearing line 156. FIG. 1c illustrates a table of projection vectors between each of the locations on initial bearing line 152 and final bearing line 156.

In this illustrative example, a plurality of ranges provides a correct solution for a course and speed of contact 120 that match the measured data points, i.e., the bearing lines. No combination of projected target locations or ranges on initial bearing line 152 and final bearing line 156 provide a higher probability of a correct range. In this case, referred to as a single leg measurement, the determination of relative range is beyond the capability of the method. To resolve the ambiguity in the range measurement, one method is to take measurements along a second sensor track, while, a second method uses remotely located sensors. In this second method, the received data from the remote sensor is correlated, to a known location, to compensate for different directions of arrival of the received data.

Figure 2A:
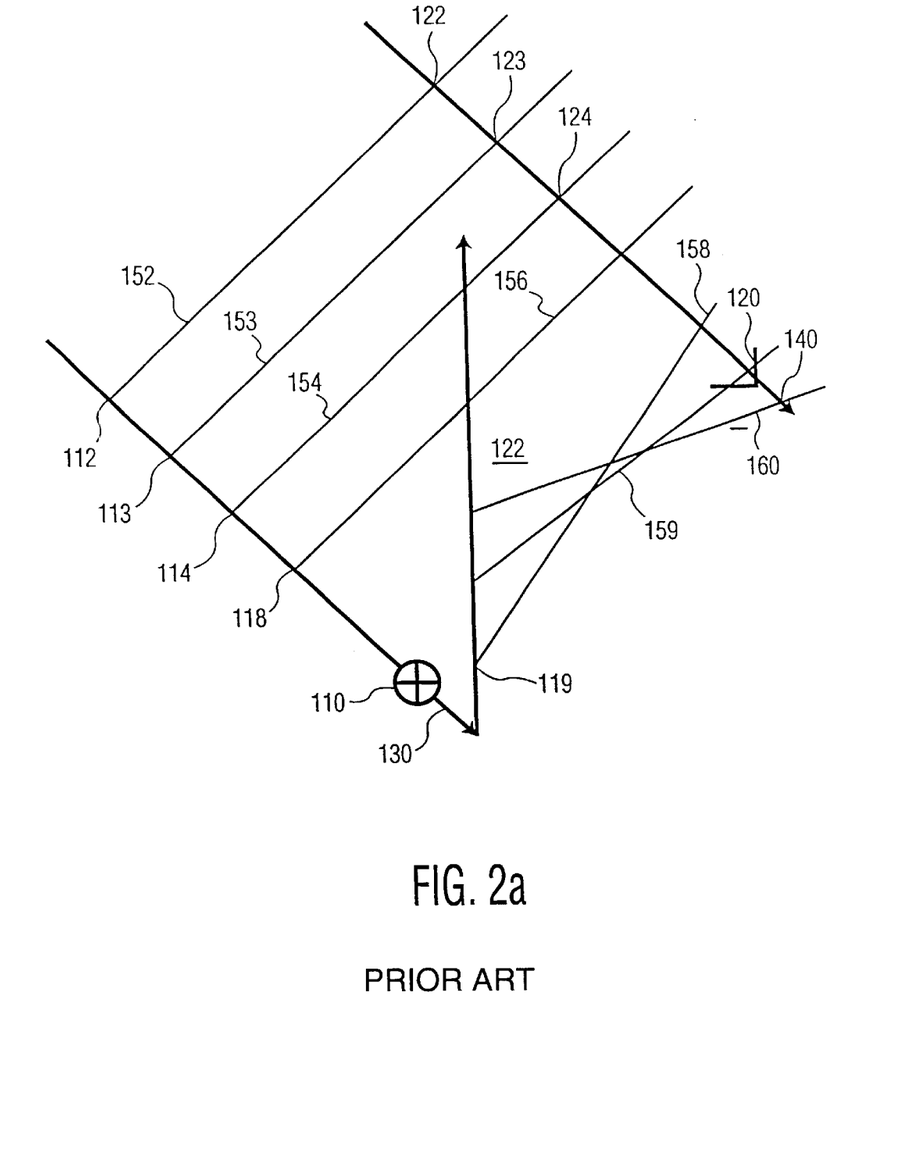
FIGS. 2a–2d illustrate a conventional method for determining a range of a radiating source.

FIG. 2a illustrates a second sensor track measurement where receiving system 110 maneuvers to take measurements along a second leg. In this illustrative example, receiving system 110 changes direction of travel, represented as track 130' such that data is received at new contact points, represented as 119, 120, etc. Bearing lines 157, 158, etc., corresponding to contact points 119, 120, etc., depict the direction of arrival of the data items from corresponding locations 129, 130, respectively of contact 120. In this example, contact 120 has not changed its course or speed during the maneuver.

Figure 2B:
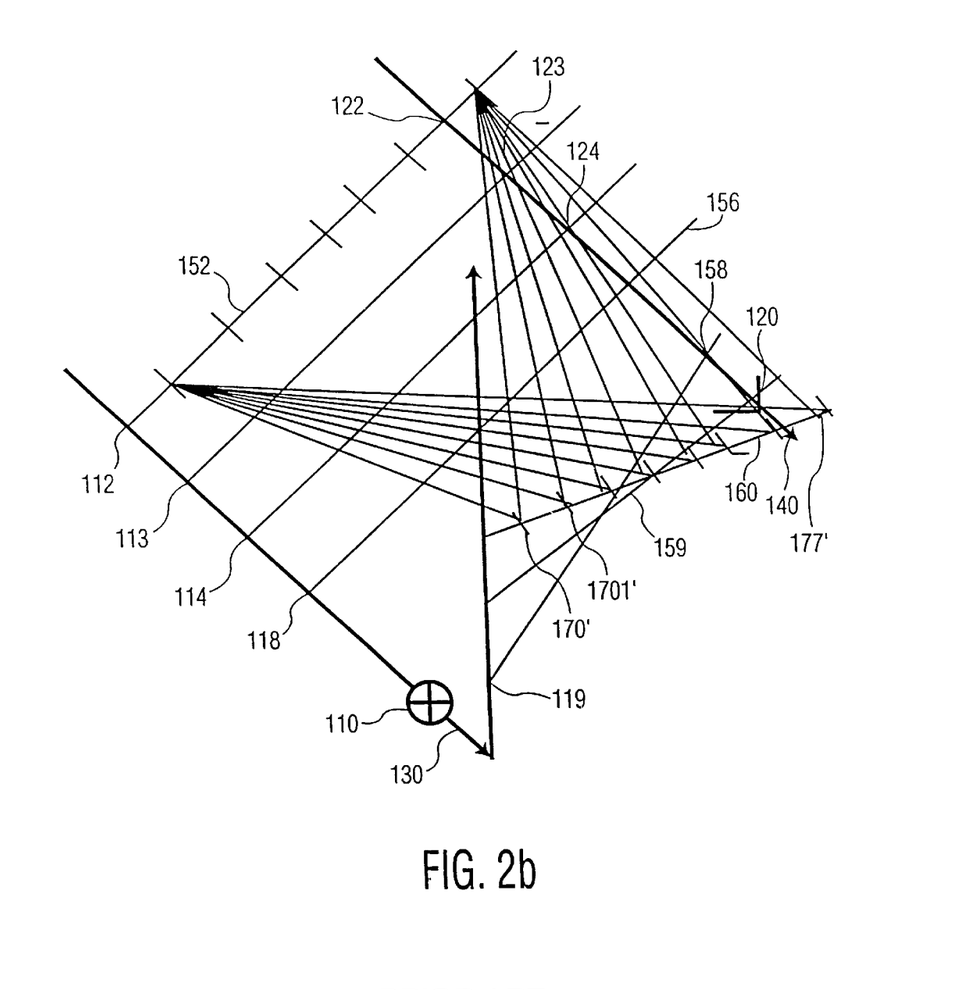
Figure 2C:
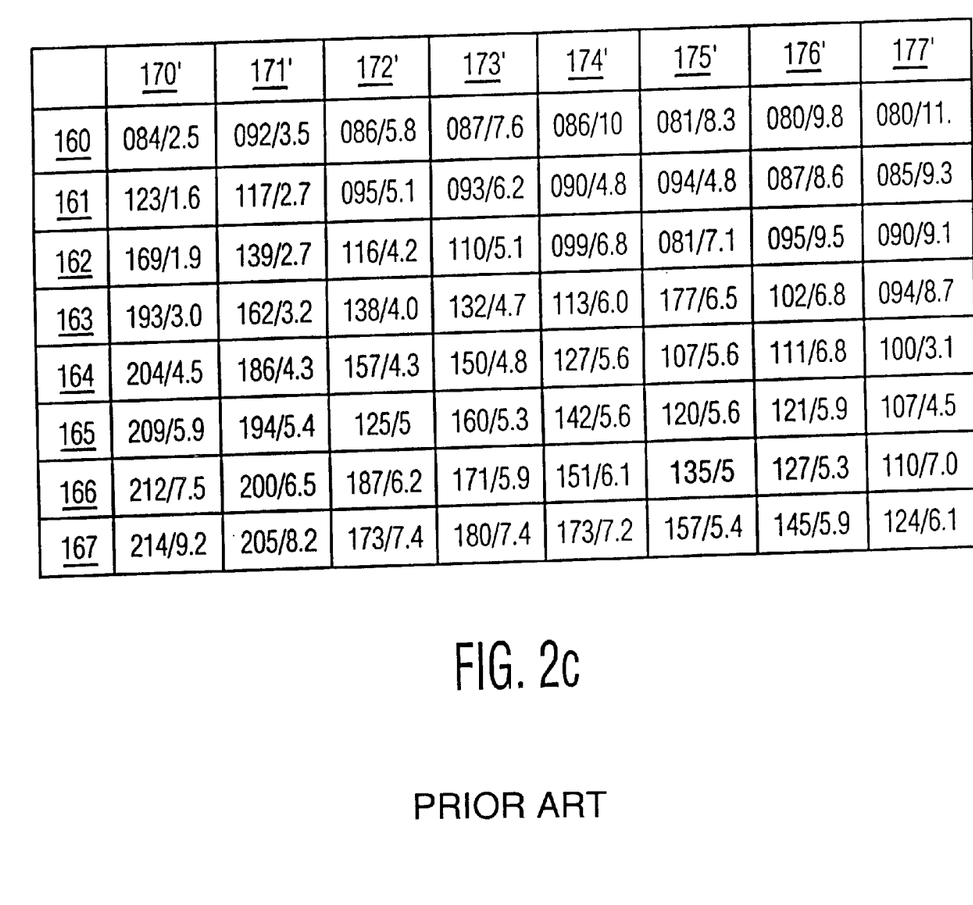

FIG. 2b again illustrates a method of determining contact or emitter range using the bearing line information collected. In this example, only the vectors from first, location 160 and last location 167 location on initial bearing line 152 to corresponding first location 170' and last location 177' on final bearing line 160 are shown for clarity. FIG. 2c, similar to FIG. 1c, tabulates the projected vectors from each location on the initial bearing line 152 to the final bearing line 160.

Figure 2D:
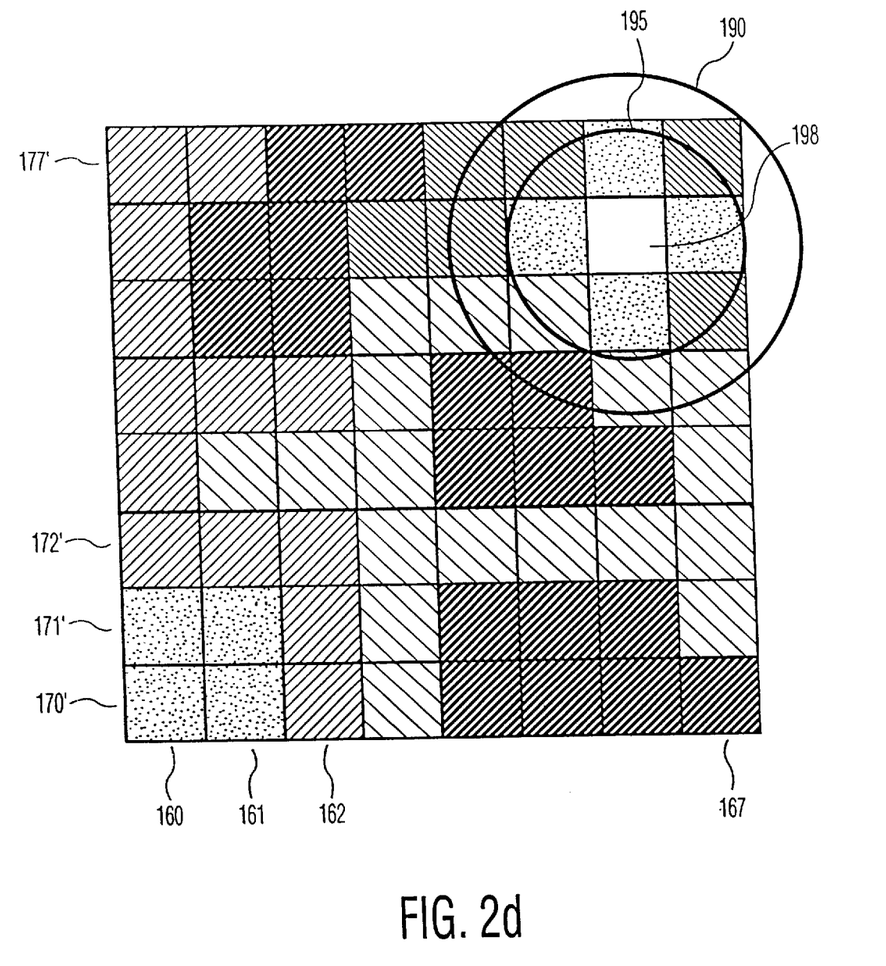

FIG. 2d depicts a method for visually presenting information for determining a contact range. In this case, a chart is coded, typically using shades of gray or colors, to indicate the quality of an error between a theoretical bearing and each of the measured bearings with respect to a specific projection vector. For example, the quality may be determined as the sum of the differences in an error, (e.g., a root mean square (RMS)), between a theoretical bearing or measured data point and each of the measured bearings. In the illustrated method of visually presenting the quality of the error, dark shading or dark colors are representative of large RMS errors while lighter shading or lighter colors are representative of a smaller RMS error. Error encoding into shades of gray or colors may be done using known translation methods. It would be understood that quantifying the determined errors using shades of gray or colors is merely one means of presenting the determined or perceived error data. Other means may include numeric, alphanumeric, graphic, textual presentation. Further, the error may be normalized to a known level or levels. For example, using a color presentation, a red coloring can be representative of a high quality (low error) measurement, while blue, green and black, can indicate progressively inferior levels of quality, i.e., higher errors. It would be appreciated that different selections of presentation type or indication level may be altered without altering the scope of the invention. FIG. 2d illustrates the error between a theoretical target motion and the projection vectors. Thus, the projection vector between point 160 and 170' results in a significant error, as represented by a very dark shading, while the projection vector between point 167 and 170' results in less of an error, as represented by a lighter shading. From this visual representation of the determined error between projection vectors and target motion, there is shown a limited number of projection vectors, and hence, range, match the received data. Highlighted region 190 illustrates those errors between the theoretical course and speed and projection vectors that are below a first threshold or within a first acceptance parameter set. Furtherstill, FIG. 2d depicts a second highlighted region 195 where the determined errors between the theoretical target course and speed and projection vectors are below a second threshold or within a second acceptance parameter set. As the second threshold or acceptance parameter set is smaller or tighter than the first set, a smaller number of projection vectors fall within region 195. In this case, these projection vectors substantially match the received data. Hence, a projected course and speed, and inferred range value can be determined from those projection vectors that substantially match the received data. In this illustrative example, the projection vector corresponding to unit 198 is representative of the best match to the target motion estimated from the received data.

As will be appreciated, a plurality of charts, such as shown in FIG. 2d, can be evaluated for a plurality of different theoretical courses and speeds from different last bearing lines. As is will be further appreciated, when multiple sensors are used, similar methods of determining potential range values may be incorporated.

Figure 3:
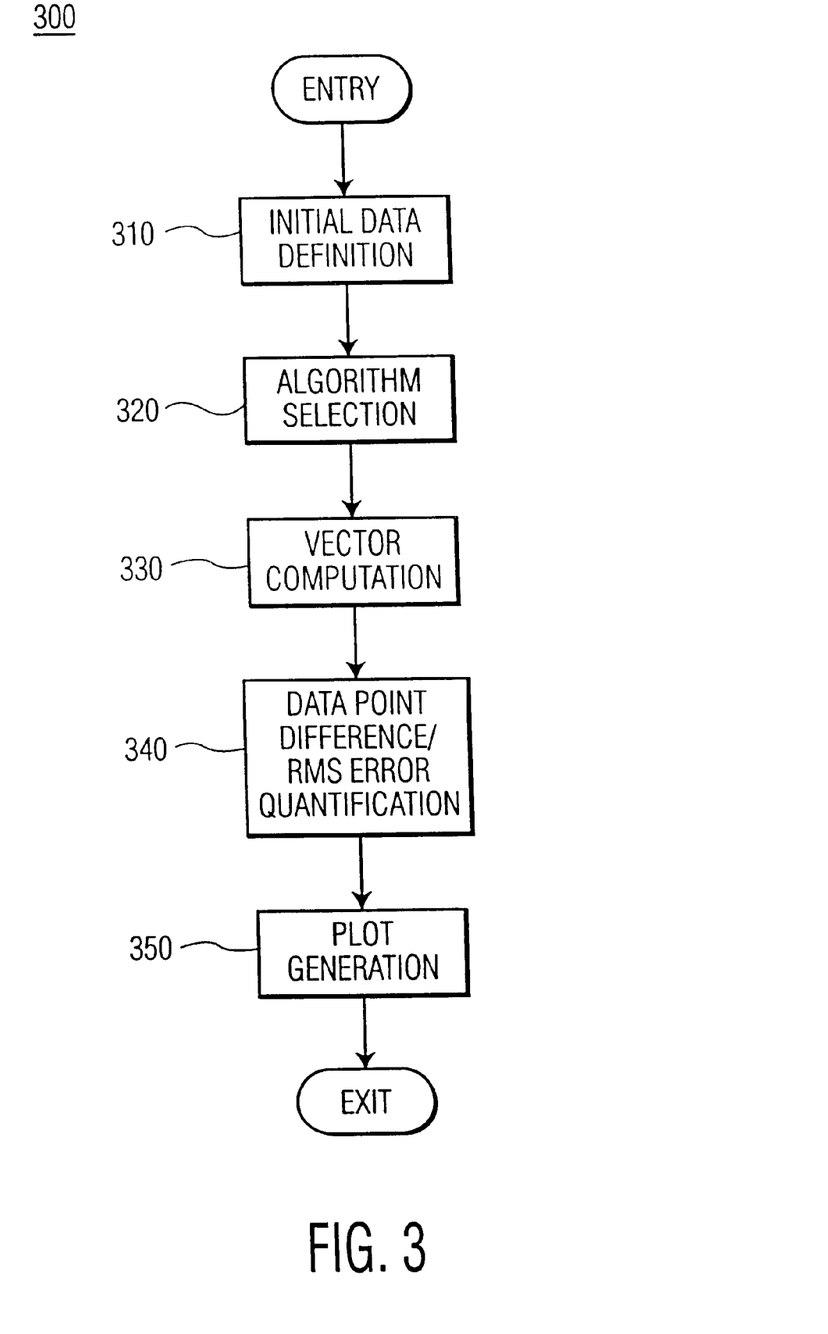
FIG. 3 illustrates a flow chart of an exemplary receiving system processing in accordance with the principles of the present invention.

FIG. 3 illustrates a flow chart 300 of an exemplary process in evaluating received data in accordance with the principles of the present invention. In this process, an initial data definition is performed at block 310. At block 320, an algorithm selection process is performed to determine the algorithmic process to be used in view of the initial data selection. At block 330, a vector computation is performed similar to that shown in FIGS. 1b and 2b and at block 340 data point difference and error quantification is performed. Error quantification is illustrated in FIG. 2d. At block 350, plots of the determined data point differences and error quantification are performed.

Figure 4:
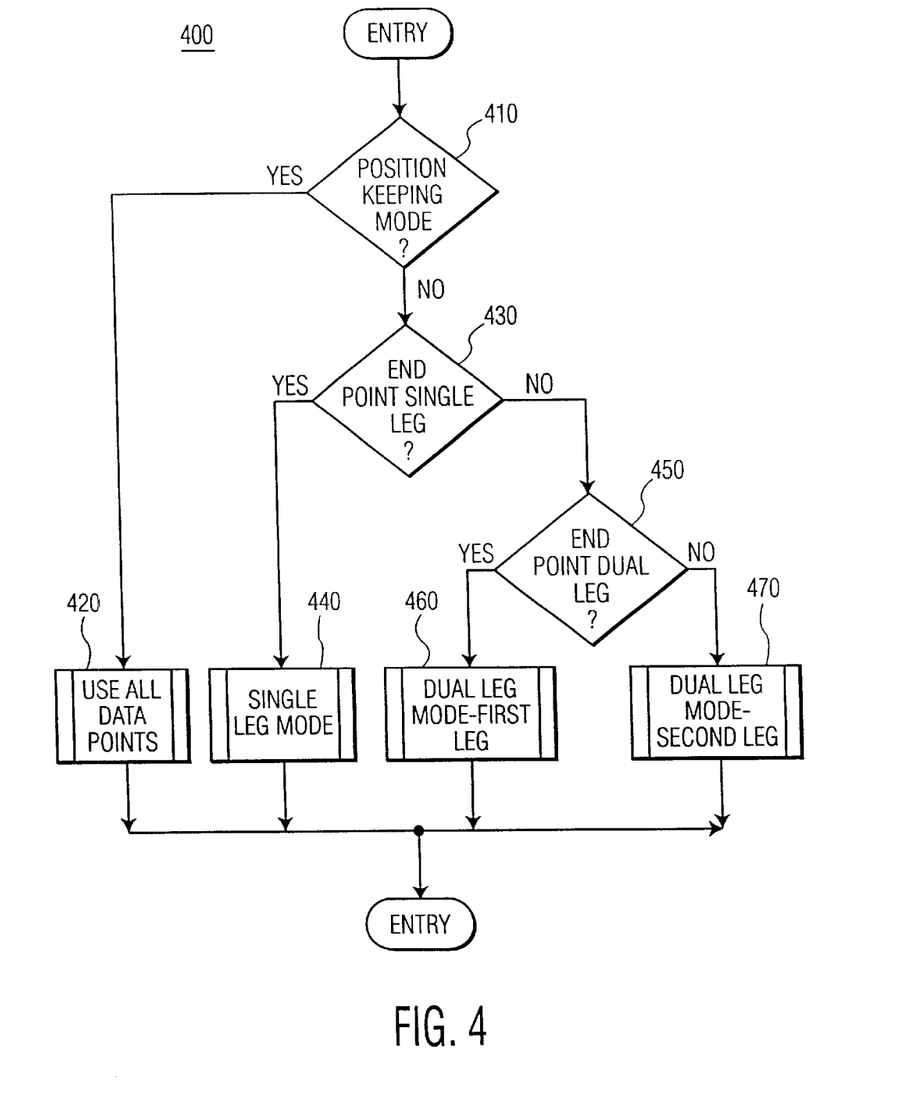
FIG. 4 illustrates a flow chart of an exemplary data definition process in accordance with the principles of the present invention.

FIG. 4 illustrates a flow chart 400 of an exemplary process in selecting measured data for processing. At block 410, a determination is made whether the received data was defined by the Position Keeping TMA mode of operation, which is well known in the art. If the answer is in the affirmative, then, at block 420, all valid (non-edited) measured data points are used in the algorithmic computations. The first point displayed, i.e., the oldest point, is defined at the first tie down point and the latest point is defined as the second tie down point. For example, referring to FIG. 1, point 112 is representative of a first tie down point, and point 118 is representative of a second tie down point.

If however, the answer at block 410 is in the negative, then a determination is made, at block 430, whether this is a single leg determination. If the answer is in the affirmative, than at block 440 all valid (non-edited) measured data points a first timeline point and a second timeline point are used. Timeline's allow an operator a means for defining at least one smaller subset of time-oriented measured data in relation to the full data set of measured data or information items available for processing. The point defined by a the first timeline is referred to as a first tie down point and a point defined by a second timeline is referred to as a second tie down point.

If, however, the answer, at block 430, is in the negative, then a determination is made, at block 450, whether this is the first leg of a two-leg process, i.e., a contact maneuver process. If the answer is in the affirmative, then a contact dual leg mode first leg process is initiated at block 460. This process is similar to the process discussed previously with regard to block 440. If, however, the answer, at block 450, is in the negative, i.e., second leg, then a dual leg mode, second leg process is performed at block 470. In this mode, a third timeline point, similar to that discussed with regard to a first timeline point and a second timeline is determined. All valid (non-edited) measured data points between and including the points referred to at timeline 2 and timeline 3 are then used in the algorithmic computations. In this case, a point associated with timeline 2 is referred to as a first tie down point and a point associated with timeline 3 is referred to as a second tie down point. With the first and second tie down points determined, the initial data definition process is completed.

Figure 5:
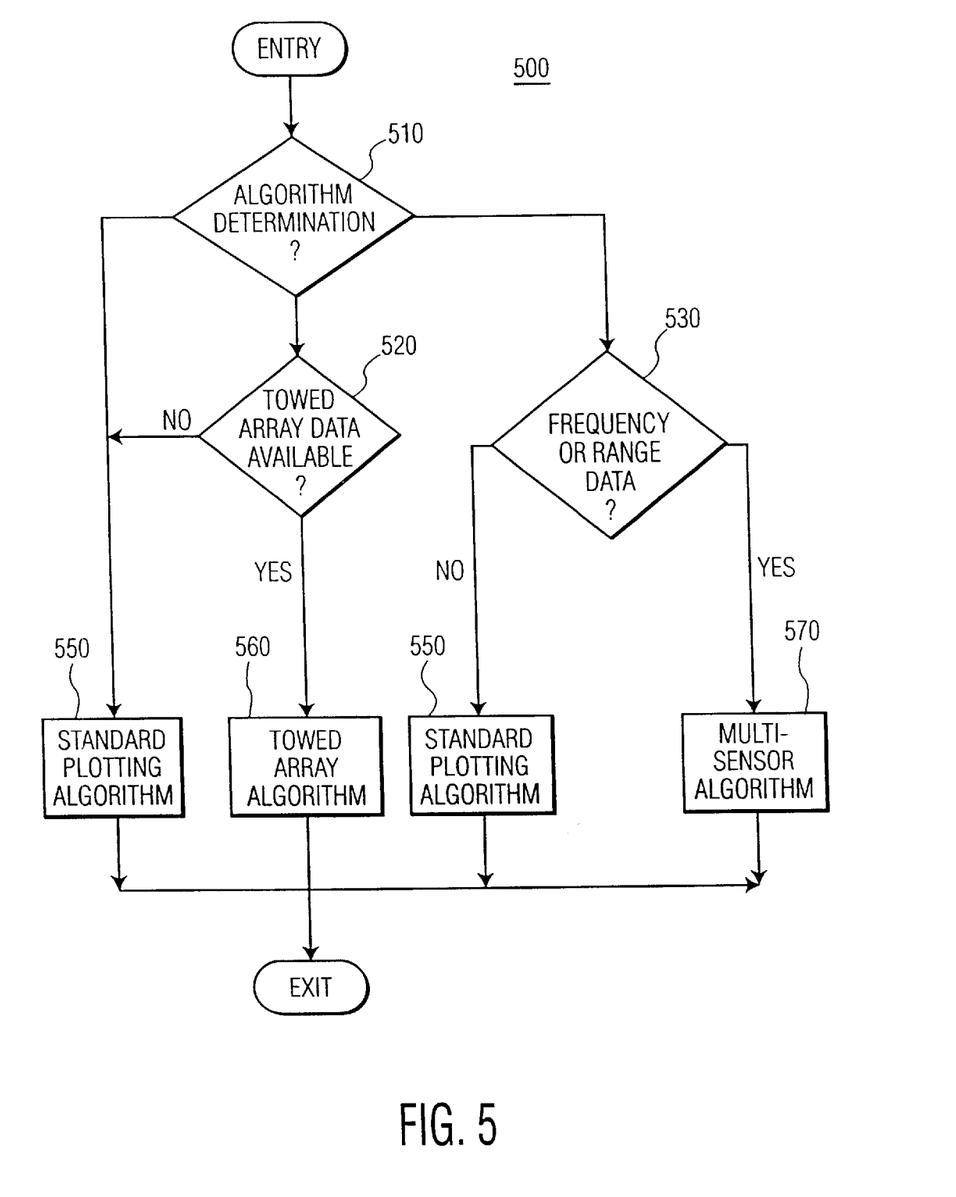
FIG. 5 illustrates a flow chart of an exemplary algorithm selection process in accordance with the principles of the present invention.

Referring now to FIG. 5, there is shown a flow chart of an exemplary processing for determining algorithm computation selection in accordance with the principles of the present invention. In this illustrative case, a determination is made, at block 510, regarding which evaluation algorithm is used to process the received measured data.

In the first instance, a error determination and evaluation algorithm is selected, at block 550, which executes a known bearing/conical angle process algorithm. In a second instance, if a remote sensor is indicated, e.g., a towed array, then associated evaluation algorithms must be executed. In the case of a towed array, for example, a known Towed Array 4 Quadrant evaluation algorithm or a Towed Array Dual Path evaluation algorithm may be executed. In the case of a towed array remote sensor, then a determination is made, at block 520, whether azimuth and conical data is available. Conical data may be data received from at least one remotely located towed sensor. Conical data requires special processing to correct errors in the signal path and an ambiguity inherent in the array. In either case, the data received by the towed array sensor is translated to compensate for differences in the angle of arrival of the received data at the remotely located sensor with regard to desired reference point.

If the answer, at block 520, is in the affirmative, indicating towed array conical data is available, then a known bearing/conical angle process algorithm is selected for data evaluation and error computation. As would be understood by those skilled in the art, the selected algorithm would be repeated, up to four times, to determine each Port/Starboard quadrant combination for a Towed Array 4 Quadrant plot and would be repeated twice to determine a "direct" path and "bottom bounce" path of a received signal, at block 560. If, however, the answer, at block 520, is in the negative, known bearing process algorithm is selected for evaluation and plot computation, at block 550.

Returning to block 510, in a third instance, i.e., a Multi-sensor condition, a determination is made, at block 530, whether information items, such as frequency or range data, are available in addition to azimuth/conical data. If the answer is in the affirmative, then a known bearing/conical angle process multi-sensor process algorithm is selected, at block 570. If, however, the answer, at block 530, is in the negative, a known bearing process algorithm is selected, at block 550.

It will be appreciated that the selection of a process algorithm may be selectable by a user, or may be automatically selectable using a selection algorithm. For example, a selection algorithm may select a processing algorithm that operates on those information items that have the highest quality largest quantity or may select an algorithm that operates on the largest number of information items of a selected measured data (e.g., bearing, frequency, and or range). In this latter case, when range rate and bearing data are available, then a multi-sensor algorithm has a higher probability of selection than a known bearing only algorithm.

Figure 6:
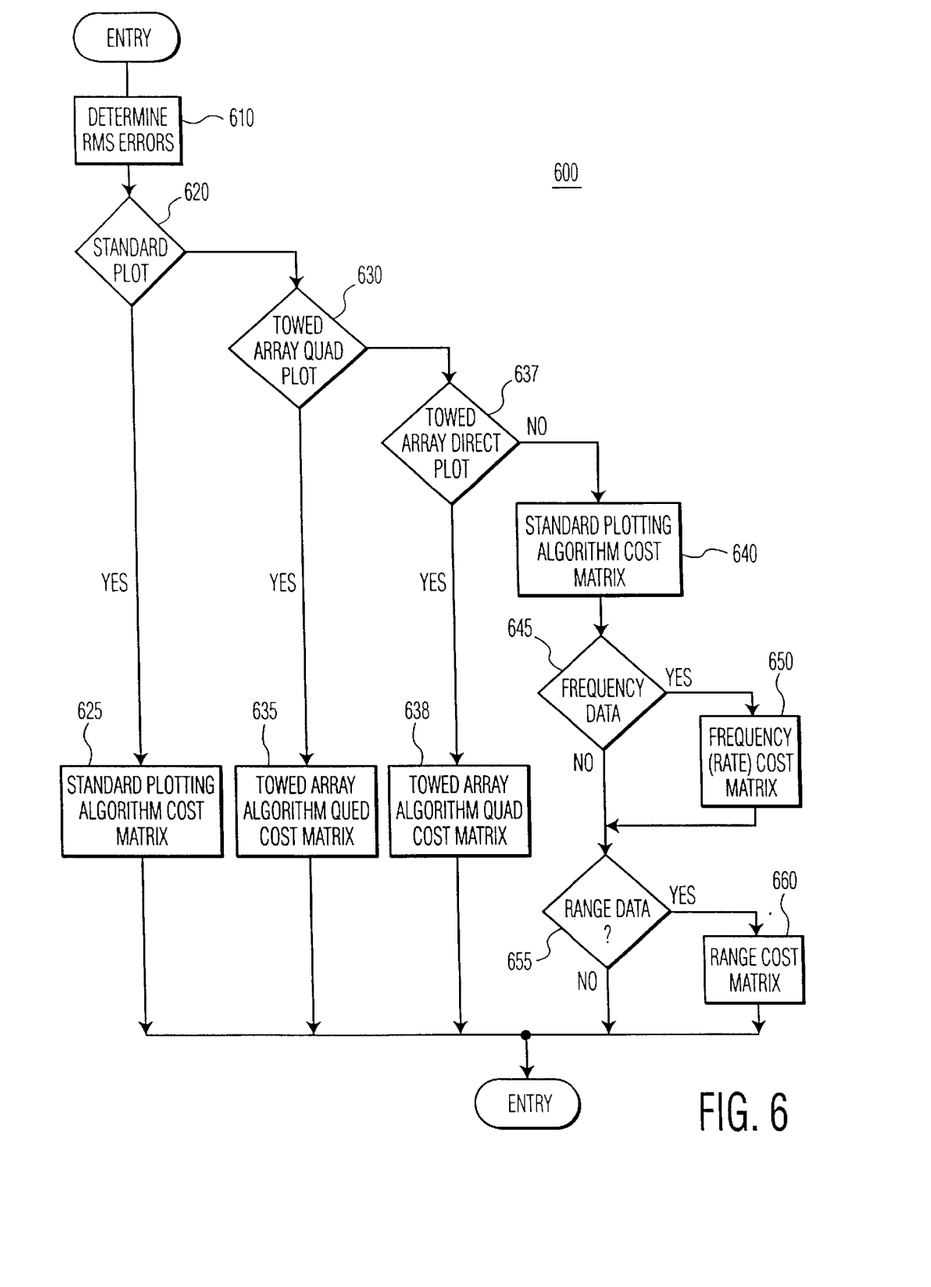
FIG. 6 illustrates a flow chart of an exemplary sensor algorithm selection process in accordance with the principles of the present invention.

FIG. 6 illustrates a flow chart of an exemplary processing for evaluating the selected measured data points in view of the data contained therein and the selected processing algorithms. In this exemplary process, at block 610, for each projection vector, as illustrated in FIG. 1b, a difference between a selected theoretical value or vector and a measured information item data value is determined. In a preferred embodiment, the RMS of the sum of the differences is determined for each measured information item type (i.e., bearing, frequency, range, etc.). The resultant RMS difference or error is maintained for the selected theoretical value or vector in a corresponding vector cost matrix. Theoretical measurement values or vectors may be selected from the group comprising, azimuthal bearing, conical angle, range and range rate or frequency. Determination of RMS error is well known in the art and need not be discussed herein.

The RMS error values of the measured data points or information items, e.g., bearing, or range, or range rate, differences are next quantified to provide a unique vector solution for display. The error values may be quantified by means such as, normalizing, rounding, curving, etc., each element so as to provide a substantially uniform presentation of the errors among each of the cost matrices determined. As would be appreciated, each cost matrix can be processed using a different means or factor in order to provide consistent presentation material among each of the cost matrices.

At block 620, a determination is made whether a bearing processing only is available. If the answer is in the affirmative, then at block 625 a bearing only cost matrix is developed. A "cost function" or "cost matrix" is determined as the difference between the actual measured data received and the expected measured data that would be received based on a selected theoretical parameter or parameter set.

If, however, the answer, at block 620, is in the affirmative, then at block 630 a determination is made whether only remote sensing Towed Array data is available. If the answer is in the affirmative, then at block 635 a cost matrix is determined for each combination of Port/Starboard ambiguity, otherwise one cost matrix is determined for a direct path and a bottom bounce path.

If, however, the answer at block 630 is in the negative, then a determination is made at block 637 whether a towed array direct/bounce plot is indicated. If the answer is in the affirmative, then a towed array algorithm cost matrix is determined at block 638 for both the direct and the bounce paths. If, however, the answer is in the negative, then a bearing cost matrix is determined for bearing only processing at block 640. Determinations are next made at block 645 and 655, respectively, whether other information items are available at each data point. In this illustrative example, at block 645, a determination is made whether frequency or range rate data is available in the selected measured data. If the answer is in the affirmative, then a range rate cost matrix is determined at block 650. Otherwise, at block 655, a determination is made whether range data is available in the measured data. If the answer is in the affirmative, then a range cost matrix is determined at block 660. These cost matrix are then used to index into predefined quantified color tables based upon the RMS error values to assign specific color coding to the specific vector associated with the matrix cell. A final composite matrix of quantified colors is established using the Bearing, Range and or Range Rate vector established quantified colors levels out of the matrix.

Figure 7:
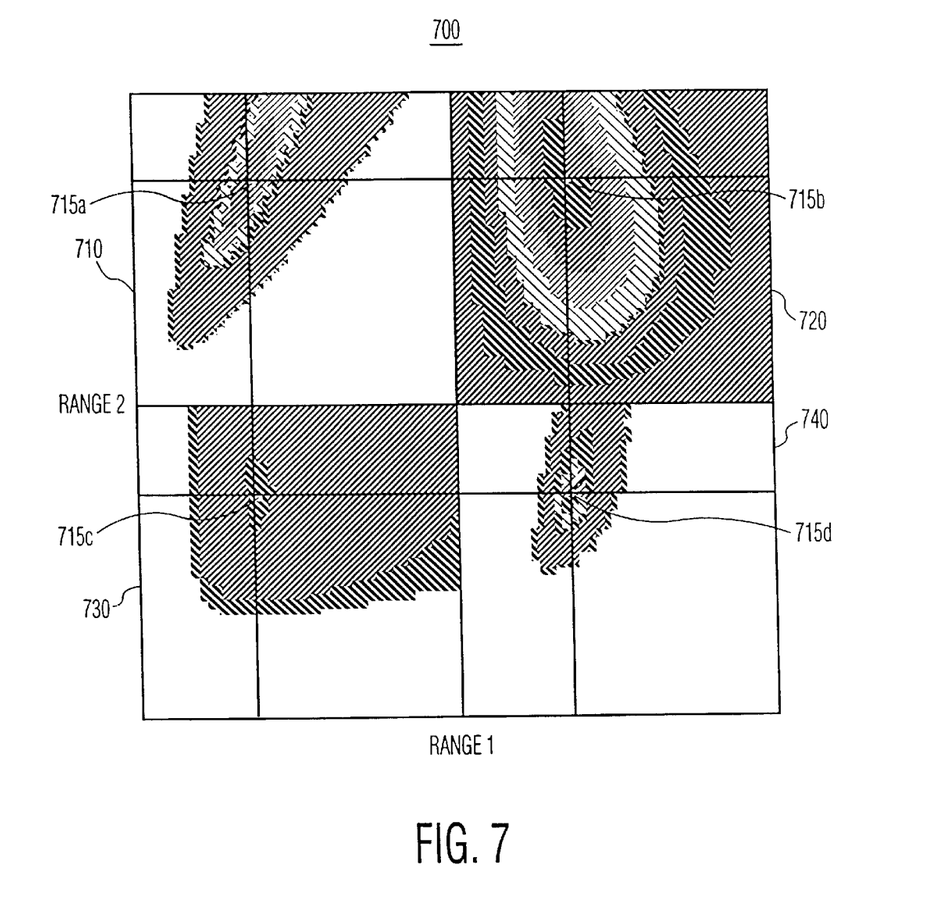
FIG. 7 illustrates an exemplary display of multi-mode processing in accordance with the principles of the present invention.

FIG. 7 illustrates an exemplary multi-sensor solution image display in accordance with the principles of the present invention. In this exemplary display, quantified bearing only information is presented as image 810, quantified range rate information is presented at image 720, quantified range information is presented as image 730, and s composite of the Bearing, Range and/or Range Rate plots is displayed as image 740. The projected location of a radiating source using the quantified information is represented as points 715a, 715b, 715c, and 715d in images 710, 720, 730 and 740 respectively. The projected location may be determined in each of the illustrated images, in x-y coordinates, or latitude-longitude coordinates for example, by placing a cross-hair over those areas representative of a minimal error. The project location coordinates can then be compared one against the other to qualify and refine the location or range. The display of a plurality of images and their corresponding quantified error distribution s advantageous as it permits a visual determination of to scenarios that have larger error distributions and discarding them continued use. For example, in FIG. 7, image 720 illustrates a substantially large error distribution and lacks convergence of the data around projected location 715b. However, image 740 illustrates a convergence of the error distribution around projected location 715d. Hence, image 720 provides a minimal amount of information in determining an actual location from the projected locations and can be discarded or not relied upon.

Figure 8:
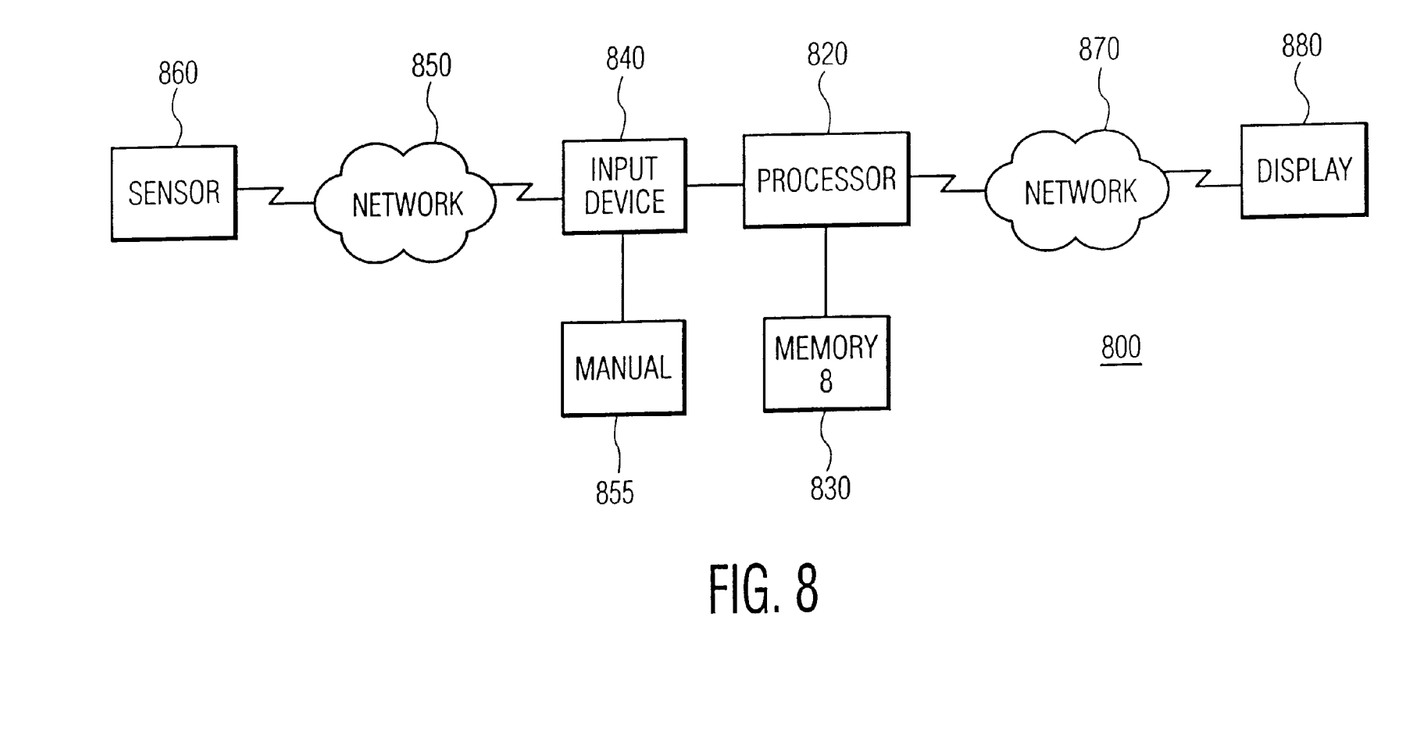
FIG. 8 illustrates an exemplary system operable to execute the principles of the invention.

FIG. 8 illustrates an exemplary system 800 for practicing the principles of the invention. In this exemplary system, processor 820 is in communication with memory 830 and input device 840. Processor 820 may be any means, such as handheld calculator, special purpose or general purpose processing system, or may be a hardware configuration, such as a dedicated logic circuit, integrated circuit, Programmable Array Logic (PAL), Application Specific Integrated Circuit (ASIC), or a combination of software and hardware that can perform the operations illustrated in FIG. 3. For example, processor 820 may include code, which when executed, performs the operations illustrated in FIG. 3. The code may be contained in memory 830 to which processor 820 may access. Similarly, the operations illustrated in FIG. 3 may be performed sequentially or in parallel using different processors to determine specific values. Input device 840 in this exemplary example, receives data from sensor 860 over a network 850 and the data may be immediately accessible by processor 820 or may be stored in memory 830. As will be appreciated, input device 840 may also allow for manual input device 855, such as a keyboard or keypad entry or may read data from magnetic or optical medium.

After processing the input data, the processor may display the resultant effectiveness on display 880 via network 870. As will be appreciated, networks 850 and 880 may be an internal network among the illustrated components, e.g., ISA bus, microchannel bus, PCMCIA bus, etc., or may be an external network, such as a Local Area Network, Wide Area Network, POTS network, or the Internet. It would be appreciated that the scope of the subject matter claimed is not altered by the use or lack of network connections.

While there has been shown, described, and pointed out, fundamental novel features of the present invention as applied to preferred embodiments thereof, it will be understood that various omissions and substitutions and changes in the method described, in form and details disclosed, and in operation, may be made by those skilled in the art without departing from the spirit of the present invention. Further, it is expressly intended that all combinations of those elements and/or method steps which perform substantially the same function in substantially the same way to achieve the same results are within the scope of the invention. Substitutions of elements from one described embodiment to another are also fully intended and contemplated.

We claim:

1. A method for determining tracking and motion information from a set of received data points including at least one information item, said method comprising the steps of:
    selecting a determined number of data points from said set of received data points;
    determining at least one cost matrix for each information item included in said selected data points;
    quantifying each of said at least one cost matrix with regard to a known form; and
    providing a presentation for each of said quantified matrices.

2. The method as recited in claim 1 wherein the step of selecting a determined number of data points is accomplished manually.

3. The method as recited in claim 1 wherein the step of selecting a determined number of data points is accomplished automatically.

4. The method as recited in claim 1 wherein the step of selecting a determined number of data points is accomplished automatically with manual assistance.

5. The method as recited in claim 1 wherein the step of determining at least one cost matrix further comprises the step of:
    determining an error between an expected value and an actual measured value for an associated information item included in said data points.

6. The method as recited in claim 5 wherein said error is determined as a root mean square error.

7. The method as recited in claim 1 wherein the step of quantifying comprises adjusting the elements by a factor corresponding to each of said cost matrix.

8. The method as recited in claim 7 wherein said corresponding factor is representative of a normalizing factor.

9. The method as recited in claim 7 wherein said corresponding factor is representative of a rounding factor.

10. The method as recited in claim 7 wherein said corresponding factor is representative of a curve factor.

11. The method as recited in claim 1 wherein said presentation is selected from the group comprising: gray shades, color, numeric, alphanumeric, graphic, text.

12. The method as recited in claim 1 wherein said cost matrix presentation is performed concurrently.

13. A system for determining tracking and motion information from a set of received data points containing at least one information item comprising:
    at least one processor operable to execute code for:
        selecting a determined number of data points from said received data points;
        determining a one cost matrix corresponding to each of said information items included in said selected data points;
        quantifying each of said at least one cost matrix with regard to a known form; and
        providing a presentation for each of said quantified matrices.

14. The system as recited in claim 13 wherein said processor is responsive to a manual selection of said determined number of data points.

15. The system as recited in claim 13 wherein said processor is further operable for executing code for selecting a determined number of data points automatically.

16. The system as recited in claim 13 wherein said processor is further operable for executing code for selecting a determined number of data points automatically in response to a manual selection.

17. The system as recited in claim 13 wherein said processor is further operable for executing code for determining at least one cost matrix by determining an error between an expected value and an a value.

18. The system as recited in claim 17 wherein said error is determined as a root mean square error.

19. The system as recited in claim 13 wherein processor is further operable for executing code for quantifying said cost matrices by adjusting elements contained therein by a factor, said factor associated with a corresponding one of said cost matrices.

20. The system as recited in claim 19 wherein said corresponding factor is representative of a normalizing factor.

21. The system as recited in claim 19 wherein said corresponding factor is representative of a rounding factor.

22. The system as recited in claim 19 wherein said corresponding factor is representative of a curve factor.

23. The system as recited in claim 13 wherein said presentation is selected from the group comprising: gray shades, color, numeric, alphanumeric, graphic, text.

24. The system as recited in claim 13 wherein said processor is further operable for executing code to present said cost matrices concurrently.

25. The system as recited in claim 13 further comprising components in communication with said processor selected from the group comprising: receiving devices, input device, transmitting device, output devices, memory, network connections, networks, displays.

* * * * *